US006704214B1

(12) United States Patent
Gibbs et al.

(10) Patent No.: US 6,704,214 B1
(45) Date of Patent: Mar. 9, 2004

(54) EXCITATION CONTROL SYSTEM AND METHOD EMPLOYING DE-EXCITATION TRIP LOGIC

(75) Inventors: Irving A. Gibbs, Fletcher, NC (US); Charles R. Mummert, Hendersonville, NC (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/370,212

(22) Filed: Feb. 19, 2003

(51) Int. Cl.[7] .............................................. H02H 7/125
(52) U.S. Cl. .............................. 363/87; 363/54; 363/70
(58) Field of Search ............................... 363/87, 54, 70, 363/129

(56) References Cited

U.S. PATENT DOCUMENTS

| 4,723,106 A | * | 2/1988 | Gibbs et al. ................. 322/26 |
| 5,345,375 A | * | 9/1994 | Mohan ......................... 363/40 |
| 5,440,222 A | * | 8/1995 | Tanaka et al. ................ 322/25 |
| 5,963,440 A | | 10/1999 | Gibbs et al. |
| 5,963,441 A | | 10/1999 | Gibbs et al. |
| 6,046,917 A | | 4/2000 | Gibbs et al. |
| 6,208,120 B1 | | 3/2001 | Gibbs |
| 6,232,751 B1 | | 5/2001 | Farr et al. |

* cited by examiner

*Primary Examiner*—Bao Q. Vu
(74) *Attorney, Agent, or Firm*—Martin J. Moran (57) ABSTRACT

An excitation control system includes a circuit breaker, a bridge and a controller. The bridge converts AC phases from the breaker to an excitation voltage. The controller includes an output to open the breaker, a first sub-system inputting voltages corresponding to the AC phases and outputting a sensed voltage, and a second sub-system inputting the excitation voltage and outputting a sensed excitation voltage. A first function detects a trip signal and responsively outputs firing signals to the bridge to provide a negative excitation voltage. A second function determines if a threshold is greater than the sensed voltage and if the trip signal is asserted, and responsively asserts the output to open the breaker. A third function determines if the trip signal is asserted and responsively delays for a predetermined time, unless a negative threshold is greater than the sensed excitation voltage, and after the predetermined time responsively asserts the output.

22 Claims, 3 Drawing Sheets

EXCITATION CONTROL SYSTEM AND METHOD EMPLOYING DE-EXCITATION TRIP LOGIC

BACKGROUND OF THE INVENTION

1. Field of the Invention

This invention pertains generally to excitation control systems for rotating electrical apparatus and, more particularly, to such systems which provide excitation voltage to a generator. The invention also pertains to methods for providing an excitation voltage for a rotating electrical apparatus.

2. Background Information

Three-phase rectifier circuits are commonly employed to convert AC signals to DC signals. These circuits often use SCRs disposed in one or more bridge segments, with typically one SCR for each polarity of each AC phase. Typically, a bridge firing control circuit controls the firing point for each rectifier in each AC cycle. Examples of such circuits are disclosed in U.S. Pat. Nos. 5,963,440; 5,963,441; 6,046,917; 6,208,120; and 6,232,751.

SCR bridges are commonly employed in an excitation control system to provide field excitation for a rotating electrical apparatus (e.g., large synchronous generators and motors, utility synchronous generators and motors, industrial synchronous generators and motors, synchronous generators and motors for naval or other shipping applications, synchronous generators and motors for oil well drilling rigs).

A typical excitation control system includes a transformer, one or more controlled rectifier bridges, one or more bridge control modules and/or a firing control module for plural bridge control modules with a communication network between the modules, and a circuit breaker (e.g., a "41 breaker") normally feeding AC power from the transformer to the controlled rectifier bridge(s). See Pat. Nos. 6,046,917; and 6,208,120.

One type of transformer is a three-phase power potential transformer (PPT) including three primary windings in a WYE-configuration and three corresponding secondary windings in a delta-configuration, although other transformer configurations may be employed (e.g., a delta-configuration in the primary and a delta-configuration in the secondary). See U.S. Pat. No. 6,232,751. The primary windings are interconnected with the AC phases from the generator, while the corresponding secondary windings are interconnected with the AC inputs of the bridge(s) by the circuit breaker. The PPT may be electrically interconnected with the terminals of the generator and, thus, that system is commonly referred to as a "terminal fed excitation system". Alternatively, the PPT may be electrically interconnected with any other suitable source of three-phase voltages. This alternative system is commonly referred to as an "auxiliary bus fed excitation system".

In a static excitation system, the PPT is electrically interconnected with a suitable (e.g., reliable) power source, such as, for example, the station power source or the generator terminals. When this power source is present and available, it may be employed to remove energy from the generator field relatively very quickly by a process known as "rapid de-excitation". Otherwise, when this power source is not available, energy is removed from the generator field at a relatively slower rate. "Rapid de-excitation" is accomplished by phasing back the firing angle of the one or more rectifier bridges, in order that a suitable negative field excitation voltage is applied to the generator field.

As an alternative to employing a negative field excitation voltage to accomplish "rapid de-excitation", a similar result may be accomplished by electrically inserting (e.g., by employing a DC contactor or DC circuit breaker) a suitable discharge resistor in series with the field excitation voltage to the generator field.

When the generator is tripped, it is beneficial to remove the energy in the field excitation circuit as quickly as possible. A suitable way to accomplish this is through "rapid de-excitation". However, if the voltage of the PPT power source is too low, such as would happen with a high side fault (e.g., a relatively low impedance and, thus, a relatively low voltage short to ground) on the generator terminals, then the circuit breaker or "41 breaker" between the transformer and the controlled rectifier bridge(s) should be immediately tripped. Known excitation control systems handle this by providing two trip inputs: (1) emergency trip, which opens the circuit breaker or "41 breaker"; and (2) normal trip, which initiates "rapid de-excitation" before the circuit breaker opens. Because it is not known whether rapid de-excitation can or cannot be successfully implemented, emergency trips result in an immediate opening of the "41 breaker".

Accordingly, there is room for improvement in excitation control systems and methods.

SUMMARY OF THE INVENTION

These needs and others are met by the present invention, which provides improvements in an excitation control system for a rotating electrical apparatus. In accordance with the invention, the ability to rapidly de-excite determines what happens after a trip signal is input by the excitation control system. When the excitation control system receives the trip signal, it attempts "rapid de-excitation" and, also, verifies that "rapid de-excitation" is occurring. If "rapid de-excitation" is not occurring, then the circuit breaker or "41 breaker" sourcing AC power to the controlled rectifier bridge is immediately opened.

The excitation control system initially attempts "rapid de-excitation" in response to the trip signal. This may be accomplished by phasing back the firing angle of the rectifier bridge, in order to attempt to apply a negative field excitation voltage to the generator field. However, if a suitable power source voltage, such as a PPT voltage, is not present, then the system immediately opens the circuit breaker or "41 breaker". Otherwise, if the suitable PPT voltage is present, then after a suitable time delay, the excitation control system verifies that the generator field voltage is sufficiently negative. If so, then "rapid de-excitation" continues to be employed. Otherwise, if the generator field voltage is insufficiently negative, then "rapid de-excitation" is not occurring and the system opens the circuit breaker or "41 breaker".

In accordance with one aspect of the invention, an excitation control system for outputting an excitation voltage for a rotating electrical apparatus comprises: an electrical switching apparatus comprising a plurality of input terminals including a plurality of alternating current phases, a plurality of output terminals, a plurality of separable contacts electrically connected between the input and output terminals, and an input to open the separable contacts, the electrical switching apparatus providing the alternating current phases at the output terminals when the separable contacts are closed; a rectifier bridge comprising a plurality of inputs electrically interconnected with the output terminals of the electrical switching apparatus, a plurality of segments to convert the alternating current phases to the excitation voltage, and an output having the excitation voltage, each of the segments including an element having an input responsive to one of a plurality of firing signals; and a controller comprising: an input including a first signal, an output including a second signal, the output of the controller being electrically interconnected with the input of the electrical switching apparatus, a first value, a second value, a first sensor inputting at least one voltage corresponding to the alternating current phases of the electrical switching apparatus and outputting a sensed voltage, a second sensor inputting the excitation voltage of the output of the rectifier bridge and outputting a sensed excitation voltage, a plurality of outputs, each of the outputs electrically interconnected with the input of the element of a corresponding one of the segments of the rectifier bridge to provide a corresponding one of the firing signals thereto, a first function detecting the first signal and responsively controlling the firing signals of the outputs of the controller in order to provide the excitation voltage having a negative value, a second function, and a third function determining if the first signal is asserted and responsively delaying for a predetermined time, unless the second value is greater than the sensed excitation voltage, and after the predetermined time responsively asserting the second signal, in order to open the separable contacts of the electrical switching apparatus and remove the alternating current phases from the inputs of the rectifier bridge.

The first sensor of the controller may sense a plurality of voltages corresponding to the alternating current phases of the electrical switching apparatus and provide the sensed voltage as an average of the voltages corresponding to the alternating current phases.

The first sensor of the controller may sense a plurality of voltages corresponding to the alternating current phases of the electrical switching apparatus and provide the sensed voltage as a minimum of the voltages corresponding to the alternating current phases.

The third function may employ a timer having a first input to start the timer, a second input to hold or stop the timer, a predetermined time delay and an output, the first input of the timer including the first signal, the second input of the timer being asserted if the second value is greater than the sensed excitation voltage, the output of the timer being asserted the predetermined time delay after the first input of the timer is asserted, unless the second input of the timer is asserted. The second signal may be asserted when the output of the timer and the first signal are asserted.

The predetermined time delay of the timer may be about 20 mS to about 100 mS.

The output of the timer may be being asserted: (a) the predetermined time delay after the first input of the timer is asserted, unless the second input of the timer is asserted, or (b) when the sensed excitation voltage becomes greater than the second value.

As another aspect of the invention, an excitation control system for outputting an excitation voltage for a rotating electrical apparatus comprises: a transformer having a plurality of primary windings and a plurality of secondary windings, the primary windings being powered from alternating current phases of an output of the rotating electrical apparatus, the secondary windings having a plurality of alternating current phases; an electrical switching apparatus including a plurality of input terminals electrically connected with the secondary windings of the transformer, a plurality of output terminals, a plurality of separable contacts electrically connected between the input and output terminals, and an input to open the separable contacts, the electrical switching apparatus providing the alternating current phases of the secondary windings of the transformer at the output terminals when the separable contacts are closed; a rectifier bridge comprising a plurality of inputs electrically interconnected with the output terminals of the electrical switching apparatus, a plurality of segments to convert the alternating current phases to the excitation voltage, and an output having the excitation voltage, each of the segments including an element having an input responsive to one of a plurality of firing signals; and a controller comprising: an input including a first signal, an output including a second signal, the output of the controller being electrically interconnected with the input of the electrical switching apparatus, a first value, a second value, a first sensor inputting at least one voltage corresponding to the alternating current phases of the electrical switching apparatus and outputting a sensed voltage, a second sensor inputting the excitation voltage of the output of the rectifier bridge and outputting a sensed excitation voltage, a plurality of outputs, each of the outputs electrically interconnected with the input of the element of a corresponding one of the segments of the rectifier bridge to provide a corresponding one of the firing signals thereto, a first function detecting the first signal and responsively controlling the firing signals of the outputs of the controller in order to provide the excitation voltage having a negative value, a second function determining if the first value is greater than the sensed voltage of the first sensor and if the first signal is asserted, and responsively asserting the second signal in order to open the separable contacts of the electrical switching apparatus and remove the alternating current phases from the inputs of the rectifier bridge, and a third function determining if the first signal is asserted and responsively delaying for a predetermined time, unless the second value is greater than the sensed excitation voltage, and after the predetermined time responsively asserting the second signal, in order to open the separable contacts of the electrical switching apparatus and remove the alternating current phases from the inputs of the rectifier bridge.

The output of the rotating electrical apparatus may include three alternating current phases, and the primary of the transformer may include three primary windings in a WYE-configuration for the three alternating current phases.

The primary of the transformer may include three primary windings for three alternating current phases, and the secondary of the transformer may include three secondary windings in a delta configuration for the three primary windings.

As another aspect of the invention, an excitation control system for outputting an excitation voltage for a rotating electrical apparatus comprises: means for sourcing a plurality of alternating current phases; means for switching the alternating current phases of the means for sourcing in response to an input; means for converting the switched alternating current phases from the means for switching to the excitation voltage responsive to a plurality of firing signals; and a controller comprising: an input including a first signal, an output including a second signal, the output of the controller being electrically interconnected with the input of the means for switching, a first value, a second value, first means for inputting at least one voltage corresponding to the alternating current phases of the means for sourcing and outputting a sensed voltage, second means for inputting the excitation voltage and outputting a sensed excitation voltage, means for outputting the firing signals, means for detecting the first signal and responsively controlling the firing signals in order to provide the excitation voltage having a negative value, means for determining if the first value is greater than the sensed voltage of the first means for inputting and if the first signal is asserted, and responsively asserting the second signal in order to remove the switched alternating current phases from the means for converting, and means for determining if the first signal is asserted and responsively delaying for a predetermined time, unless the second value is greater than the sensed excitation voltage, and after the predetermined time responsively asserting the second signal, in order to remove the switched alternating current phases from the means for converting.

As another aspect of the invention, a method for providing an excitation voltage for a rotating electrical apparatus comprises: sourcing a plurality of alternating current phases; switching the alternating current phases in response to an input; converting the switched alternating current phases to the excitation voltage responsive to a plurality of firing signals; inputting a first signal; outputting a second signal as the input; employing a first value; inputting the excitation voltage and outputting a sensed excitation voltage; detecting the first signal and responsively controlling the firing signals in order to provide the excitation voltage having a negative value; and determining if the first signal is asserted and responsively delaying for a predetermined time, unless the first value is greater than the sensed excitation voltage, and after the predetermined time responsively asserting the second signal, in order to remove the switched alternating current phases.

The method may further comprise employing a second value; inputting at least one voltage corresponding to the alternating current phases and outputting a sensed voltage; and determining if the second value is greater than the sensed voltage and if the first signal is asserted, and responsively asserting the second signal in order to remove the switched alternating current phases.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The present invention is described in association with a bridge rectifier supplying excitation voltage to a generator, although the invention is applicable to a wide range of excitation control systems and methods for supplying an excitation voltage to a rotating electrical apparatus.

Figure 1:
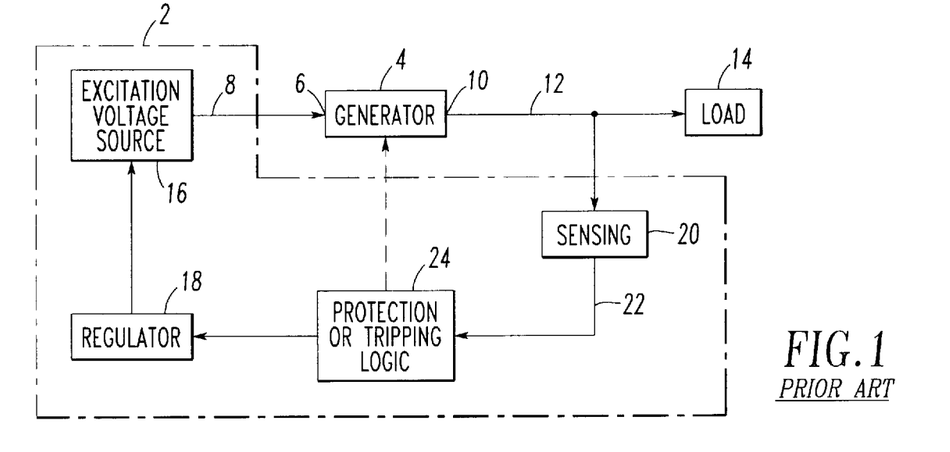
FIG. 1 is a block diagram of an excitation control system.

Referring to FIG. 1, an excitation control system 2 for a rotating electrical apparatus, such as the exemplary generator 4, is illustrated. The generator 4 includes an input 6 responsive to an excitation voltage 8 and an output 10 having one or more alternating current phases 12, each having a current flowing therein and a voltage, which supply power to a load 14. One or more circuit breakers (not shown) may be disposed between the generator 4 and the load 14.

The exemplary excitation control system 2 includes an excitation voltage source 16 which provides the excitation voltage 8 to the input 6 of the generator 4, and a regulator 18 for regulating the excitation voltage. A sensing sub-system for the alternating current phases 12 senses generator current and/or generator voltage and provides an electrical signal 22 (e.g., generator line current, generator watts) related to the output 10 of the generator 4. Protection or tripping logic 24 employs protection or trip parameters for protecting or tripping the generator 4.

Figure 2:
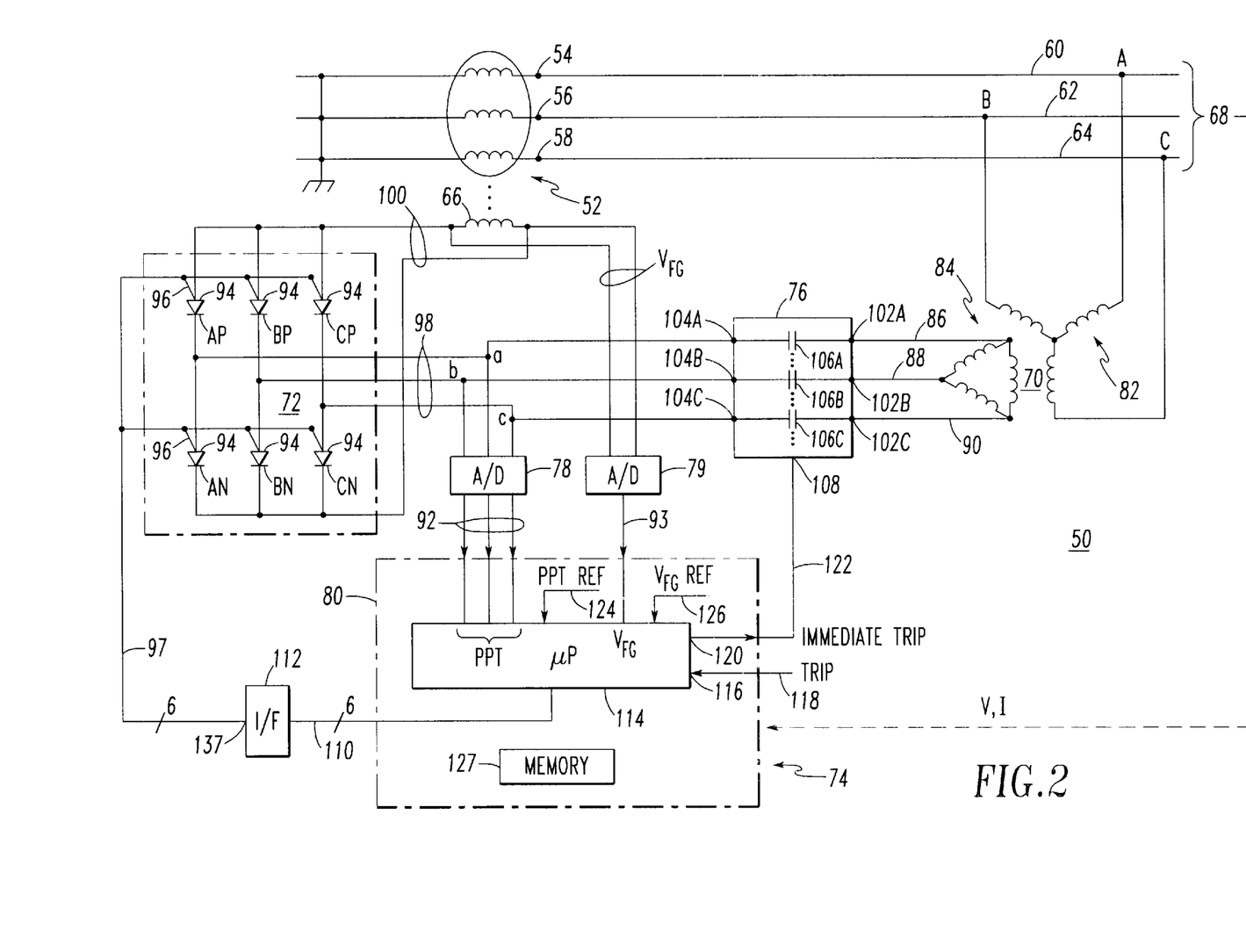
FIG. 2 is a block diagram of an excitation control system in accordance with the present invention.

Referring to FIG. 2, an excitation control system 50 for a three-phase generator 52 is illustrated. The generator 52 includes output terminals 54,56,58 having three alternating current (AC) phases 60,62,64 (A,B,C), respectively, and a generator field input 66 responsive to an excitation voltage. The three AC phases 60,62,64 provide power to a power circuit 68.

The excitation control system 50 includes a transformer 70, one or more controlled rectifier bridges 72 (only one bridge 72 is shown), a controller 74, an electrical switching apparatus, such as the exemplary three-phase circuit breaker 76 (e.g., a "41 breaker"), and analog-to-digital (A/D) converters 78,79, which employ suitable signal conditioning (not shown). The exemplary controller 74 includes a suitable processor, such as microprocessor ($\mu$P) 80. Although a single bridge 72 and a single controller 74 are shown, the invention is applicable to excitation control systems and methods including a plurality of bridges controlled by one or more controllers. Although the A/Ds 78,79 are shown separate from the $\mu$P 80, a suitable processor, such as, for example, a microcontroller (not shown), may incorporate one or both of such A/Ds.

The exemplary transformer 70 is a three-phase power potential transformer (PPT) including three primary windings 82 in a WYE-configuration and three corresponding secondary windings 84 in a delta-configuration, although other transformer configurations may be employed (e.g., a delta-configuration in the primary and a delta-configuration in the secondary). The primary windings 82 are interconnected with the AC phases 60,62,64, while the corresponding secondary windings 84 have three AC phases 86,88,90 (a,b,c), respectively, each of which has a positive polarity and a negative polarity and a common frequency (e.g., 50 Hz, 60 Hz). The $\mu$P 80 typically receives one, two or three digital AC signals 92 from the A/D 78 at the secondary or bridge side of the PPT 70, and a digital +/–DC signal 93 from the A/D 79 at the generator field input 66. The PPT 70 is normally connected to the terminals 54,56,58 of the generator 52. Alternatively, the PPT 70 may be connected to any other suitable source (not shown) of three-phase voltages.

As is well known, one or more bridges of semiconductor controlled rectifiers (SCRs) or thyristors, such as the bridge 72, are generally employed to convert alternating current (AC) sinusoidal signal waveforms to direct current (DC). The exemplary bridge 72 receives a multi-phase current input from a common AC source, such as the PPT 70 and the closed circuit breaker 76, although other suitable power sources (e.g., a motor generator, field transformer) may be employed. A three-phase current input is employed in this example, although the invention is applicable to a wide range of phase counts.

The exemplary bridge 72 has six cells or segments, one for each polarity of each of the phase currents, although the invention is applicable to a wide range of segment counts. Each bridge segment includes its own element or semiconductor device, such as the exemplary SCR or thyristor 94, that has a firing input 96. For example, segment AP refers to the positive polarity of phase a, while segment AN refers to the negative polarity of phase a. The remaining segments of the bridge 72 are noted in a similar manner by reference characters BP,BN,CP,CN.

When a suitable control signal 97 is provided to one of the inputs 96, the corresponding SCR 94 fires to, thereby, control current conduction (e.g., by starting or initiating current conduction) within the corresponding segment between the inputs 98 and the output 100 of the bridge 72. Typically, as is well-known in the art, the individual segments of the bridge 72 are fired every 60 degrees of the AC cycle in the order: AP,CN,BP,AN,CP,BN. One of the SCRs 94 does not stop conducting until it is reversed biased.

The inputs 98 of the bridge 72 are interconnected with the AC phases 86,88,90 of the secondary windings 84 of the transformer 70 by the circuit breaker 76. All of the positive rectifier output currents are summed together and the negative rectifier output currents are similarly summed and conveyed by corresponding positive and negative conductors of output 100 to the generator field input 66 in order to provide the excitation voltage thereto.

The exemplary circuit breaker 76 includes three input terminals 102A, 102B, 102C electrically connected with the secondary windings 84 of the transformer 70, three output terminals 104A,104B,104C, three sets of separable contacts 106A, 106B,106C electrically connected between such input and output terminals, and an input 108 to open such separable contacts. The circuit breaker 76 provides the three AC phases 86,88,90 at the output terminals when the separable contacts 106A,106B,106C, respectively, are closed.

The controller 74 functions to regulate the output of the generator 52 in terms of phase current and three-phase voltage of the AC phases 60,62,64. The controller 74 suitably maintains the three-phase voltages to the power circuit 68 and increases or decreases the excitation voltage to the generator 52 with respective higher or lower levels of current. In order to accomplish that change, the firing angle 138 (FIG. 3) employed by the bridge 72 is delayed (i.e., retarded, reduced or decreased) or advanced (i.e., increased) to decrease or increase, respectively, the excitation voltage. Thus, if the three-phase voltage of the power circuit 68 goes down, then the firing angle is reduced to provide more field current to the generator 52.

A phase control circuit (not shown) employs a phase reference signal (not shown) to determine exactly when to fire each of the SCRs 94 in the SCR bridge 72 and, thereby, generate the six firing signals 110, which are output by interface (I/F) 112 to the bridge 72. The generator 52 and the excitation control system 50 employ a suitable generator starting circuit and algorithm (not shown) for controlling initial start-up of the generator 52 (e.g., when there is no voltage being output by the generator 52 to the three phases 60,62,64).

Figure 3:
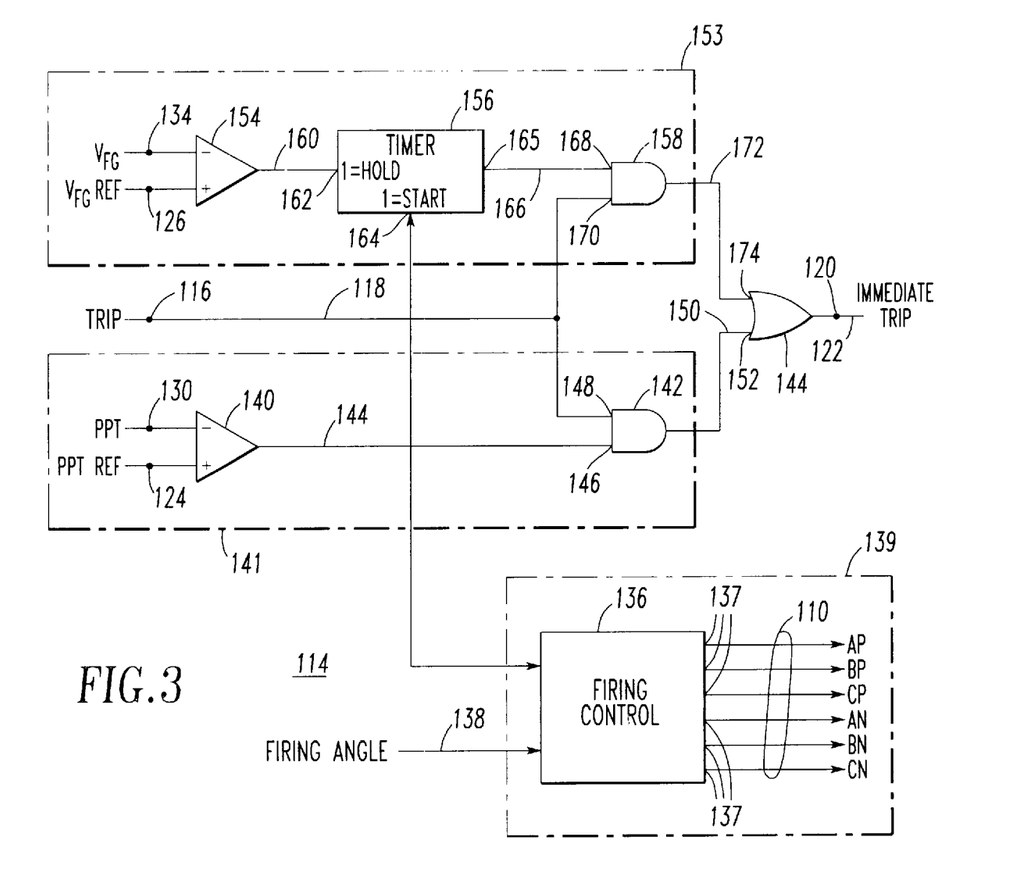
FIG. 3 is a block diagram of de-excitation trip logic for the excitation control system of FIG. 2.

Referring to FIG. 3, de-excitation trip logic 114 for the excitation control system 50 of FIG. 2 is shown. The logic 114 includes an input 116 having a TRIP signal 118 and an output 120 having an IMMEDIATE TRIP signal 122. As shown in FIG. 2, the output 120 is electrically interconnected with the input 108 of the circuit breaker 76. The logic also employs two reference values: (1) a PPT REF value 124; and (2) a negative $V_{FG}$ REF value 126. Preferably, the values 124,126 are stored in a memory 127 of the μP 80 of FIG. 2. Alternatively, the values 124,126 may be input and/or adjusted by any suitable circuit or method.

Figure 4:
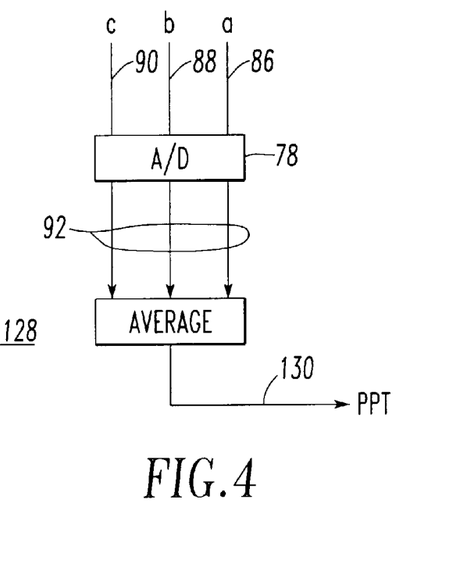
FIG. 4 is a block diagram of a voltage sensing sub-system for the excitation control system of FIG. 2 in accordance with an embodiment of the invention.

A suitable sensor, such as the A/D 78 of FIG. 2, inputs one or more of the voltages associated with the three AC phases 86,88,90 (a,b,c). The A/D 78 outputs one, two or three digital AC signals 92 to the μP 80. One suitable example of voltage sensing is shown in FIG. 4. The μP 80 employs a voltage sensing sub-system 128, which outputs the sensed voltage or PPT signal 130 as the average of the RMS voltages of the three digital AC signals 92.

Figure 5:
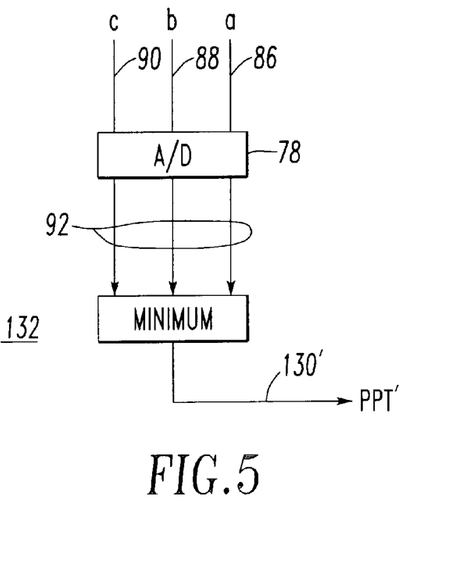
FIG. 5 is a block diagram of a voltage sensing sub-system for the excitation control system of FIG. 2 in accordance with another embodiment of the invention.

Alternatively, as shown in FIG. 5, the μP 80 employs a voltage sensing sub-system 132, which outputs the sensed voltage or PPT signal 130' as the minimum of the RMS voltages of the three digital AC signals 92. The signal 130' is, in turn, employed in place of the PPT signal 130 of FIG. 3.

As other alternatives, the μP 80 may employ any one of the RMS voltages, an average of any two of the RMS voltages, or the minimum of any two of the RMS voltages of the digital AC signals 92.

Referring again to FIG. 3, the actual PPT signal 130 is preferably stated in terms of a per unit of the rated PPT AC RMS voltage (e.g., without limitation, 240, 480, 600, 1200 $VAC_{RMS}$). The PPT REF value 124 is preferably stated in terms of a fraction (e.g., without limitation, 0.5) of the rated PPT AC RMS voltage.

A suitable sensor, such as the A/D 79 of FIG. 2, inputs the excitation voltage of the generator field input 66 and outputs the corresponding digital +/−DC signal 93 to the μP 80 for use as the sensed excitation voltage or VFG signal 134.

As is well known, a firing control circuit 136 inputs a firing angle 138 and outputs the firing signals 110 (e.g., AP,BP,CP,AN,BN,CN) to the rectifier bridge 72 of FIG. 2. In accordance with the invention, the firing control circuit 136 also inputs the TRIP signal 118 for use in the manner as discussed below.

The logic 114 provides three functions, as follows. The first function 139 is provided by the firing control circuit 136, which detects the TRIP signal 118 and responsively controls the firing signals 110, in order to initiate "rapid de-excitation" by phasing back the firing angle 138 to the rectifier bridge 72. In turn, the bridge 72 applies a suitable negative field excitation voltage to the generator field input 66. The second and third functions 141,153 generate the IMMEDIATE TRIP signal 122, which is employed to open the circuit breaker 76, and, thus, remove power to the rectifier bridge 72 and, in turn, to the generator field excitation voltage.

The second function 141 includes comparator 140, AND gate 142 and one input 152 of OR gate 144. The comparator 140 compares the actual PPT signal 130 to the PPT REF value 124. If the PPT REF value 124 is greater than the actual PPT signal 130, then the true signal 144 is applied to the input 146 of the AND gate 142. The other input 148 of the AND gate 142 receives the TRIP signal 118. If the TRIP signal 118 is asserted, then the true signal 150 is applied to the input 152 of the OR gate 144, which, then, asserts the IMMEDIATE TRIP signal 122, in order to open the separable contacts 106A,106B,106C of the circuit breaker 76 of FIG. 2. This second function 141 provides the immediate trip function, thereby ignoring "rapid de-excitation," if there is insufficient or no PPT voltage to the rectifier bridge 72 whenever the TRIP signal 118 is asserted.

For example, if the nominal PPT AC RMS voltage is 480 $VAC_{RMS}$, the PPT REF value 124 is 0.5 per unit, the actual PPT signal 130 is less than 0.5 per unit (e.g., 0.4 per unit), and the TRIP signal 118 is true, then the IMMEDIATE TRIP signal 122 is asserted, in order to open the circuit breaker 76 and remove the alternating current phases 86,88,90 from the inputs 98 of the rectifier bridge 72 of FIG. 2.

The actual field generator voltage value, the $V_{FG}$ signal 134, is preferably stated in terms of a positive or negative per unit of the rated field generator voltage range (e.g., without limitation, about −600 VDC to about +600 VDC; a function of the PPT AC RMS voltage). The $V_{FG}$ REF value 126 is preferably stated in terms of a negative fraction (e.g., without limitation, about −0.5; about −0.1; about −0.9) of the maximum rated field generator voltage.

The third function 153 includes comparator 154, timer 156, AND gate 158 and the other input 174 of the OR gate 144. The comparator 154 compares the actual $V_{FG}$ signal 134 to the negative $V_{FG}$ REF value 126. If the negative $V_{FG}$ REF value 126 is greater than the actual $V_{FG}$ signal 134, then the true signal 160 is applied to the hold input 162 of the timer 156. The start input 164 of the timer 156 receives the TRIP signal 118. The timer 156 times for a predetermined time after the start input 164 is asserted unless the hold input 162 is asserted. When the timer 156 times out, the timer output 165 applies a true signal 166 to the input 168 of the AND gate 158. The other input 170 of the AND gate 158 receives the TRIP signal 118. If the TRIP signal 118 is asserted, then the true signal 172 is applied to the input 174 of the OR gate 144, which, then, asserts the IMMEDIATE TRIP signal 122, in order to open the separable contacts 106A,106B,106C of the circuit breaker 76 of FIG. 2. This third function 153 provides the immediate trip function, thereby ignoring "rapid de-excitation," if there is insufficiently negative field generator voltage a delay time after the TRIP signal 118 is asserted.

For example, if the $V_{FG}$ REF value 126 is −0.5 (e.g., −300 VDC for a +/−600 VDC bridge) and if the actual $V_{FG}$ signal 134 is −0.4 (e.g., −240 VDC for a +/−600 VDC bridge) or greater than the $V_{FG}$ REF value 126, then the timer 156 is not held after it is started by the TRIP signal 118. If both the timer output signal 166 and the TRIP signal 118 are asserted, then the IMMEDIATE TRIP signal 122 is asserted, in order to open the circuit breaker 76. This is because the actual field generator voltage value, the $V_{FG}$ signal 134, must be suitably negative, as compared to the negative $V_{FG}$ REF value 126, in order to accomplish "rapid de-excitation". If, however, the negative $V_{FG}$ REF value 126 is greater than the actual $V_{FG}$ value 134 (i.e., if the actual field generator voltage value is sufficiently negative), then the signal 160 is true and the timer 156 is held or stopped. Hence, this extends the period of the timer 156 for the time that the signal 160 is asserted. Whenever the timer 156 expires, the timer output signal 166 is asserted.

The timer 156 employs a suitable predetermined time delay of about 20 mS to about 100 mS, although any suitable time value (e.g., without limitation, less than about 1 S; less than about 0.5 S; about 100 mS; about 50 mS; about 20 mS; less than about 20 mS) may be employed. The timer output signal 166 is asserted the predetermined time delay after the timer start input 164 is asserted, unless the timer hold input 162 is asserted. Preferably, the predetermined time delay is suitably set, in order that there is: (a) sufficient time for the actual $V_{FG}$ signal 134 to initially become negative and, preferably, suitably negative, and (b) then allow the remaining time to be less than about 20 mS.

The TRIP signal 118 may be asserted by any suitable generator trip logic (not shown) (e.g., by employing any suitable control output, such as a contact, a protective relay, or any suitable communication method or channel for control).

As a simplified alternative, the second function 141 need not be employed and, thus, the IMMEDIATE TRIP signal 122 may be solely derived from the signal 172 of the third function 153.

Figure 6:
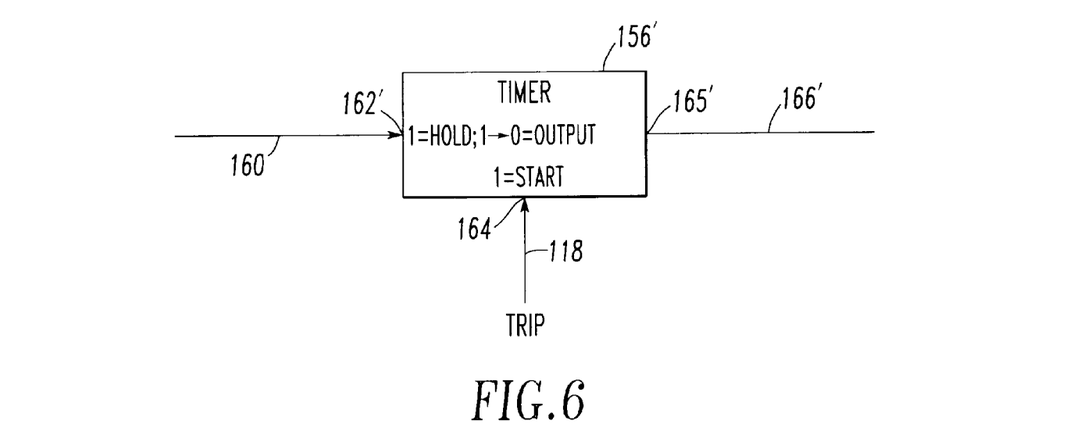
FIG. 6 is a block diagram of a de-excitation trip logic timer for the logic of FIG. 3 in accordance with another embodiment of the invention.

Referring to FIG. 6, an alternative timer 156' is shown. The timer 156' is similar to the timer 156 of FIG. 3, although the function of the hold input 162' is modified with respect to the hold input 162 of the timer 156. When the negative $V_{FG}$ signal 134 of FIG. 3 transitions from more negative to more positive than the negative $V_{FG}$ REF value 126 and the hold input 162' transitions from true to false, the timer output signal 166' of output 165' and, thus, the IMMEDIATE TRIP signal 122 are both asserted without any additional time delay. Thus, the timer output signal 166' is set when: (1) the timer 156' expires the predetermined time after it was started, or (2) the actual field generator voltage value, the $V_{FG}$ signal 134, transitions from being more negative to more positive than the negative $V_{FG}$ REF value 126 as determined by the true to false transition of the hold input 162'. Preferably, the predetermined time delay of the timer 156' is about 20 mS to about 100 mS.

Although the exemplary excitation control system 50 may implement the comparisons, timer and logic of FIGS. 3 and 6 in firmware or software, it will be appreciated that a combination of one or more of analog, digital and/or processor-based circuits may be employed.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An excitation control system for outputting an excitation voltage for a rotating electrical apparatus, said excitation control system comprising:

an electrical switching apparatus comprising a plurality of input terminals including a plurality of alternating current phases, a plurality of output terminals, a plurality of separable contacts electrically connected between said input and output terminals, and an input to open said separable contacts, said electrical switching apparatus providing the alternating current phases at said output terminals when said separable contacts are closed;

a rectifier bridge comprising a plurality of inputs electrically interconnected with the output terminals of said electrical switching apparatus, a plurality of segments to convert said alternating current phases to said excitation voltage, and an output having said excitation voltage, each of said segments including an element having an input responsive to one of a plurality of firing signals; and a controller comprising:
an input including a first signal, an output including a second signal, the output of said controller being electrically interconnected with the input of said electrical switching apparatus, a first value, a second value, a first sensor inputting at least one voltage corresponding to the alternating current phases of said electrical switching apparatus and outputting a sensed voltage, a second sensor inputting said excitation voltage of the output of said rectifier bridge and outputting a sensed excitation voltage, a plurality of outputs, each of said outputs electrically interconnected with the input of the element of a corresponding one of said segments of said rectifier bridge to provide a corresponding one of the firing signals thereto, a first function detecting the first signal and responsively controlling the firing signals of the outputs of said controller in order to provide said excitation voltage having a negative value, a second function, and a third function determining if the first signal is asserted and responsively delaying for a predetermined time, unless the second value is greater than the sensed excitation voltage, and after said predetermined time responsively asserting the second signal, in order to open the separable contacts of said electrical switching apparatus and remove the alternating current phases from the inputs of said rectifier bridge.

2. The excitation control system of claim 1 wherein said elements are semiconductor devices.

3. The excitation control system of claim 1 wherein the first sensor of said controller senses a plurality of voltages corresponding to the alternating current phases of said electrical switching apparatus and provides said sensed voltage as an average of said voltages corresponding to said alternating current phases.

4. The excitation control system of claim 1 wherein the first sensor of said controller senses a plurality of voltages corresponding to the alternating current phases of said electrical switching apparatus and provides said sensed voltage as a minimum of said voltages corresponding to said alternating current phases.

5. The excitation control system of claim 1 wherein said first function employs a firing angle to control the firing signals of the outputs of said controller, with said firing angle being reduced in order to provide said excitation voltage having the negative value.

6. The excitation control system of claim 1 wherein said second function employs a comparator function comparing the first value to the sensed voltage of said first sensor to determine if the first value is greater than the sensed voltage of said first sensor, and an AND function responsively asserting the second signal when the first signal is asserted and when said first value is greater than said sensed voltage of said first sensor, in order to open the separable contacts of said electrical switching apparatus and remove the alternating current phases from the inputs of said rectifier bridge.

7. The excitation control system of claim 1 wherein said third function employs a comparator function comparing the second value to the sensed excitation voltage to determine if said second value is greater than the sensed excitation voltage.

8. The excitation control system of claim 1 wherein said third function employs a timer having a first input to start said timer, a second input to hold or stop said timer, a predetermined time delay and an output, the first input of said timer including said first signal, the second input of said timer being asserted if said second value is greater than the sensed excitation voltage, the output of said timer being asserted the predetermined time delay after the first input of said timer is asserted, unless the second input of said timer is asserted; and wherein the second signal is asserted when the output of said timer and the first signal are asserted.

9. The excitation control system of claim 8 wherein the predetermined time delay of said timer is about 20 mS to about 100 mS.

10. The excitation control system of claim 1 wherein said third function employs a timer having a first input to start said timer, a second input to hold or stop said timer, a predetermined time delay and an output, the first input of said timer including said first signal, the second input of said timer being asserted if said second value is greater than the sensed excitation voltage, the output of said timer being asserted: (a) the predetermined time delay after the first input of said timer is asserted, unless the second input of said timer is asserted, or (b) when the sensed excitation voltage becomes greater than said second value; and wherein the second signal is asserted when the output of said timer and the first signal are asserted.

11. The excitation control system of claim 10 wherein the predetermined time delay of said timer is about 20 mS to about 100 mS.

12. An excitation control system for outputting an excitation voltage for a rotating electrical apparatus, said rotating electrical apparatus including an output having a plurality of alternating current phases, said excitation control system comprising:

a transformer having a plurality of primary windings and a plurality of secondary windings, said primary windings being powered from the alternating current phases of the output of said rotating electrical apparatus, said secondary windings having a plurality of alternating current phases;

an electrical switching apparatus including a plurality of input terminals electrically connected with the secondary windings of said transformer, a plurality of output terminals, a plurality of separable contacts electrically connected between said input and output terminals, and an input to open said separable contacts, said electrical switching apparatus providing the alternating current phases of the secondary windings of said transformer at said output terminals when said separable contacts are closed;

a rectifier bridge comprising a plurality of inputs electrically interconnected with the output terminals of said electrical switching apparatus, a plurality of segments to convert said alternating current phases to said excitation voltage, and an output having said excitation voltage, each of said segments including an element having an input responsive to one of a plurality of firing signals; and a controller comprising:

an input including a first signal, an output including a second signal, the output of said controller being electrically interconnected with the input of said electrical switching apparatus, a first value, a second value, a first sensor inputting at least one voltage corresponding to the alternating current phases of said electrical switching apparatus and outputting a sensed voltage, a second sensor inputting said excitation voltage of the output of said rectifier bridge and outputting a sensed excitation voltage, a plurality of outputs, each of said outputs electrically interconnected with the input of the element of a corresponding one of said segments of said rectifier bridge to provide a corresponding one of the firing signals thereto, a first function detecting the first signal and responsively controlling the firing signals of the outputs of said controller in order to provide said excitation voltage having a negative value, a second function determining if the first value is greater than the sensed voltage of said first sensor and if the first signal is asserted, and responsively asserting the second signal in order to open the separable contacts of said electrical switching apparatus and remove the alternating current phases from the inputs of said rectifier bridge, and a third function determining if the first signal is asserted and responsively delaying for a predetermined time, unless the second value is greater than the sensed excitation voltage, and after said predetermined time responsively asserting the second signal, in order to open the separable contacts of said electrical switching apparatus and remove the alternating current phases from the inputs of said rectifier bridge.

13. The excitation control system of claim 12 wherein said transformer is a power potential transformer.

14. The excitation control system of claim 12 wherein the output of said rotating electrical apparatus includes three alternating current phases; and wherein the primary of said transformer includes three primary windings in a WYE-configuration for said three alternating current phases.

15. The excitation control system of claim 12 wherein the primary of said transformer includes three primary windings for three alternating current phases; and wherein the secondary of said transformer includes three secondary windings in a delta configuration for said three primary windings.

16. An excitation control system for outputting an excitation voltage for a rotating electrical apparatus, said excitation control system comprising:

means for sourcing a plurality of alternating current phases;

means for switching the alternating current phases of said means for sourcing in response to an input;

means for converting the switched alternating current phases from said means for switching to said excitation voltage responsive to a plurality of firing signals; and a controller comprising:
an input including a first signal,
an output including a second signal, the output of said controller being electrically interconnected with the input of said means for switching,
a first value,
a second value,
first means for inputting at least one voltage corresponding to the alternating current phases of said means for sourcing and outputting a sensed voltage,
second means for inputting said excitation voltage and outputting a sensed excitation voltage,
means for outputting said firing signals,
means for detecting the first signal and responsively controlling said firing signals in order to provide said excitation voltage having a negative value,
means for determining if the first value is greater than the sensed voltage of said first means for inputting and if the first signal is asserted, and responsively asserting the second signal in order to remove the switched alternating current phases from said means for converting, and
means for determining if the first signal is asserted and responsively delaying for a predetermined time, unless the second value is greater than the sensed excitation voltage, and after said predetermined time responsively asserting the second signal, in order to remove the switched alternating current phases from said means for converting.

17. The excitation control system of claim 16 wherein said means for determining if the first value is greater than the sensed voltage includes a third signal; wherein said means for determining if the first signal is asserted and responsively delaying includes a fourth signal; and wherein the output of said controller includes means for ORing the third and fourth signals to provide said output.

18. The excitation control system of claim 16 wherein said means for determining if the first signal is asserted and responsively delaying includes means for starting a timer in response to said first signal, means for holding or stopping said timer if said second value is greater than the sensed excitation voltage, and means for asserting the second signal a predetermined time delay after said first signal is asserted, unless said second value is greater than the sensed excitation voltage, when said first signal is asserted.

19. A method for providing an excitation voltage for a rotating electrical apparatus, said method comprising:

sourcing a plurality of alternating current phases;

switching said alternating current phases in response to an input;

converting said switched alternating current phases to said excitation voltage responsive to a plurality of firing signals;

inputting a first signal;

outputting a second signal as said input;

employing a first value;

inputting said excitation voltage and outputting a sensed excitation voltage;

detecting the first signal and responsively controlling said firing signals in order to provide said excitation voltage having a negative value; and determining if the first signal is asserted and responsively delaying for a predetermined time, unless the first value is greater than the sensed excitation voltage, and after said predetermined time responsively asserting the second signal, in order to remove said switched alternating current phases.

20. The method of claim 19 further comprising:

sourcing said alternating current phases from a power potential transformer.

21. The method of claim 19 further comprising:

employ a negative value as said first value.

22. The method of claim 19 further comprising:

employing a second value;

inputting at least one voltage corresponding to said alternating current phases and outputting a sensed voltage; and determining if the second value is greater than said sensed voltage and if the first signal is asserted, and responsively asserting the second signal in order to remove said switched alternating current phases.

* * * * *